J. H. COHEN.
PROCESS FOR TREATING SLUDGE FROM ACETYLENE GENERATION.
APPLICATION FILED JULY 23, 1917.
1,319,206. Patented Oct. 21, 1919.
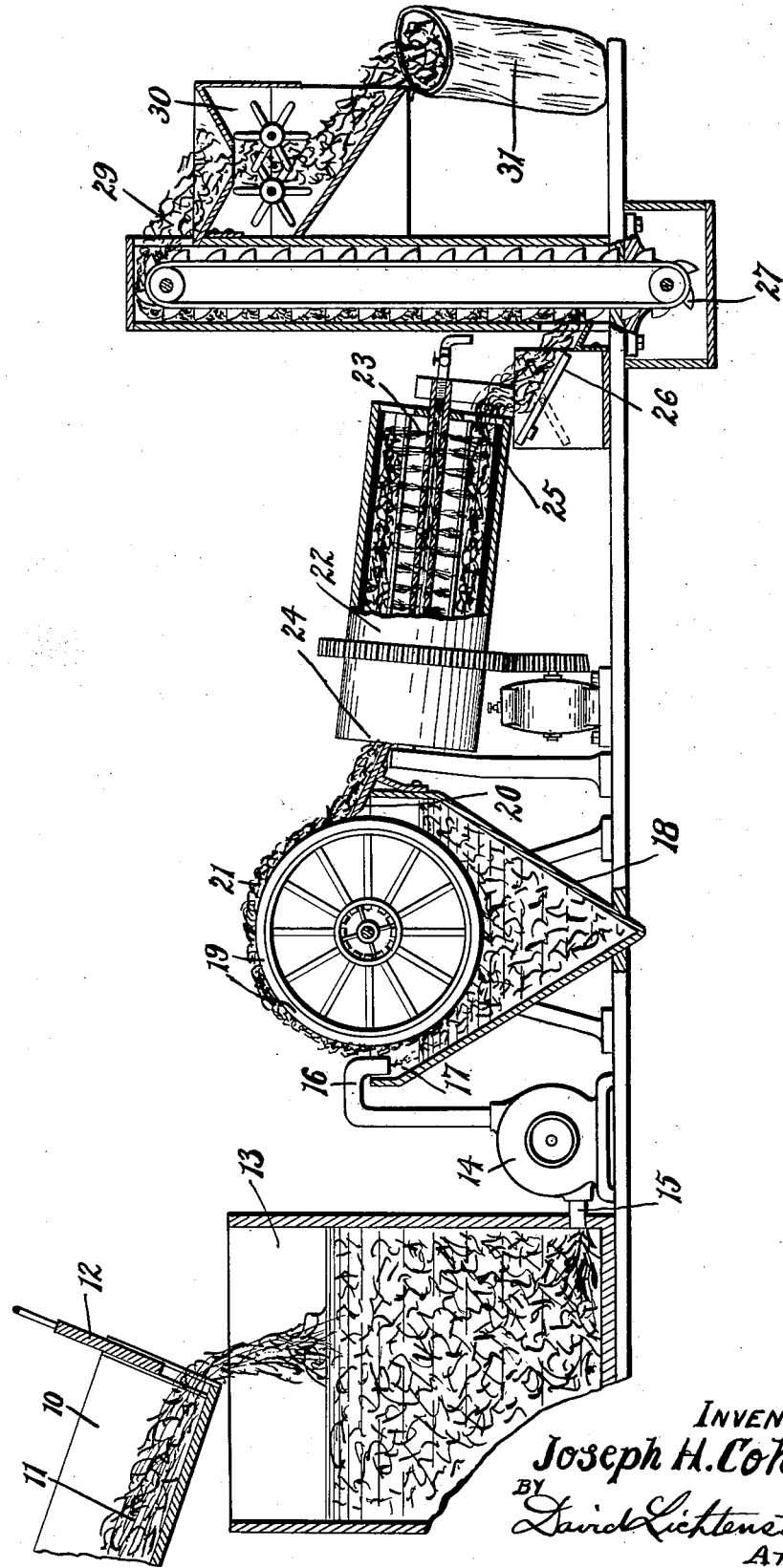
INVENTOR,
Joseph H. Cohen
BY David Lichtenstein
ATT'Y.

UNITED STATES PATENT OFFICE.

JOSEPH H. COHEN, OF BRIGHTON, MASSACHUSETTS.

PROCESS FOR TREATING SLUDGE FROM ACETYLENE GENERATION.

1,319,206.   Specification of Letters Patent.   Patented Oct. 21, 1919.

Application filed July 23, 1917. Serial No. 182,276.

*To all whom it may concern:*

Be it known that I, JOSEPH H. COHEN, a citizen of the United States, residing at Brighton, in the county of Suffolk and State of Massachusetts, have invented a certain new and useful Process for Treating Sludge From Acetylene Generation, of which the following is a specification.

In the generation of acetylene gas, by subjecting calcium-carbid to the action of water, a so-called sludge is produced by the following reaction, namely,

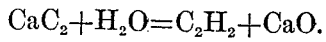

$$CaC_2 + H_2O = C_2H_2 + CaO.$$

The $C_2H_2$ is acetylene gas. The CaO reacts with water to form hydrated lime in the form of a sludge which, as it comes from the generators, consists of about 15 to 20 per cent. hydrated lime and 80 to 85 per cent. water.

It is a known fact that the sludge resulting from the generation of acetylene is today a useless and waste product which must be dumped because of its uselessness, requiring handling and cartage to do so and is regarded as nothing more than a troublesome nuisance.

To provide a means for overcoming that situation and for turning the waste product into a commercial product, as for example, powdered hydrated lime, is the object of my invention.

Referring to the accompanying sheet of drawing—

The view represents diagrammatically a plant for treating and utilizing sludge obtained from acetylene generation, and shows the apparatus of the plant in the act of producing powdered hydrated lime.

Like numerals refer to like parts throughout the several views of the drawing.

The numeral 10 represents a long open trough, or gutter, which is supplied with the sludge 11 coming from the generators of the acetylene generating plant (not shown) and is preferably provided with the discharging gate 12 through which the sludge is allowed to drop into the receiver 13. 14 represents preferably a centrifugal pump which communicates with the receiver 13 through the suction-pipe 15 and discharges through the discharge-pipe 16 into the tank 17 of the so-called filter-press 18, which is preferably of the continuous vacuum revolving drum type in which 19 represents the revolving drum. 20 represents the scrape-doctor which frees the drum of the drier sludge matter 21 adhered thereto and carried thereon, and ushers the same preferably into a rotary type of drying machine 22 which is supplied with the necessary heat, as for example, by means of the gas flames 23 which are directed against the material contained in the drying machine. The drying machine 22 is preferably inclined, as shown in the drawing, for the purpose of propelling the material from the receiving end 24 to the delivering end 25 thereof.

At the delivering-end 25 of the drying machine 22 is preferably provided the flap-gate 26 which may be tilted to properly direct the material delivered by the drying machine to the conveyer-member 27, as shown. The conveyer-member 27 delivers the dried product 29 to the pulverizing machine 30 wherein it becomes ground up to produce powdered hydrated lime and which is delivered through the pulverizing machine 30 into bags 31, or barrels, or boxes, as the case may be and according as may be desired.

Having thus described the parts of my invention in detail, the manner in which the process and plant may be employed is as follows:

First, for producing powdered hydrated lime, the sludge, as it originally comes from the acetylene generating plant, is allowed to enter the long and open trough 10 which is inclined sufficiently to advance the material slowly and in which trough the material is exposed to atmosphere for the purpose of aerating the same and relieving it by evaporation from any trace of residual acetylene gas remaining therein. The sludge coming from the acetylene generating plant is a mushy substance and contains a considerable percentage of liquor, practically 85%, as hereinabove suggested. The sludge being thus exposed to atmosphere in the trough-member 10, or in any other suitable manner for the necessary length of time, as conditions require (usually requiring but a few minutes), is then deposited into the large receiving or storage tank 13, from where the sludge is sucked through the centrifugal pump 14 and deposited into the tank 17 of the filter-press 18, where the liquor becomes separated from the solid matter in the sludge by the action of the suction taking place in the machine, and the solid matter adheres to the drum 19 of the filter-press 18; the liquor obtained from this separating process occurring in the filter-press being clear, may be disposed of by directing the same to the sewer or elsewhere if desired. The solid matter 21, resulting from the treatment in the filter-press 18, is then directed, as shown, to the drying apparatus 22, where sufficient heat is provided merely to drive off from the contents the mechanically-held water without allowing for any chemical change to be had. The reaction is:

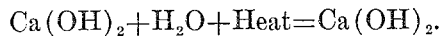
$$Ca(OH)_2 + H_2O + Heat = Ca(OH)_2.$$

The resultant product $Ca(OH)_2$ represents a commercially dry granular hydrated lime. Said product is then conveyed, as shown, by the conveyer 27 to the pulverizing machine 30, and is pulverized for the purpose of producing a more merchantable product, as "powdered hydrated lime", which may be used in connection with plastering, or in the preparation of mortar, et cetera, yielding about 1.1 pounds of powdered hydrated lime per pound of calcium-carbid originally used in the acetylene generating plant.

Having thus described my process and plant, it will be observed that the same provides a simple method for treating and utilizing the waste sludge from acetylene generating plants, the apparatus required being of the most simple nature and the plant in general being capable of handling continuous runs of sludge therethrough, and may be operated with very little attention from attendants, yielding a commercial product for which there is ready market; and thus converts the heretofore waste and useless product into a valued commercial product and does away with the nuisance and the cost of caring for same.

Having thus described my invention, what I claim as new is:

1. A method of treating and handling sludge from acetylene generating plants, comprising the following steps: aerating the same for the purpose of ridding it through evaporation of residual acetylene; filtering the same for the purpose of extracting the liquor therefrom; and then subjecting the same to forced drying sufficiently only to drive off the mechanically-held water but not to allow for any chemical change.

2. A method of treating and handling sludge from acetylene generating plants, comprising the following steps: aerating the same for the purpose of ridding it through evaporation of residual acetylene; filtering the same for the purpose of extracting the liquor therefrom; then subjecting the same to forced drying sufficiently only to drive off the mechanically-held water, but not to allow for any chemical change; and finally pulverizing the same for producing a powdered substance as powdered hydrated lime.

JOSEPH H. COHEN.

Witnesses:
 D. LICHTENSTEIN,
 LEONARD A. POWELL.